(12) United States Patent
Zhang

(10) Patent No.: US 11,574,124 B2
(45) Date of Patent: Feb. 7, 2023

(54) METHOD AND APPARATUS OF RECOGNIZING NAMED ENTITY

(71) Applicant: BOE TECHNOLOGY GROUP CO., LTD., Beijing (CN)

(72) Inventor: Lu Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 309 days.

(21) Appl. No.: 16/959,381

(22) PCT Filed: Feb. 21, 2020

(86) PCT No.: PCT/CN2020/076196
§ 371 (c)(1),
(2) Date: Jun. 30, 2020

(87) PCT Pub. No.: WO2020/215870
PCT Pub. Date: Oct. 29, 2020

(65) Prior Publication Data
US 2021/0103701 A1   Apr. 8, 2021

(30) Foreign Application Priority Data

Apr. 22, 2019 (CN) .......................... 201910325442.6

(51) Int. Cl.
*G06F 40/295* (2020.01)
*G06F 40/205* (2020.01)
(Continued)

(52) U.S. Cl.
CPC .......... *G06F 40/295* (2020.01); *G06F 40/205* (2020.01); *G06K 9/6256* (2013.01); *G06N 3/08* (2013.01)

(58) Field of Classification Search
USPC ...................................... 704/1–504
See application file for complete search history.

(56) References Cited

U.S. PATENT DOCUMENTS 10,430,648 B2 * 10/2019 Lee .......................... G06V 30/40
11,139,081 B2 * 10/2021 Tran ........................ G16H 50/70
(Continued)

FOREIGN PATENT DOCUMENTS

| CN | 107644014 A | 1/2018 |
|---|---|---|
| CN | 107885721 A | 4/2018 |

(Continued)

OTHER PUBLICATIONS

Office Action of CN Application No. 201910325442.6 and English translation, dated Jun. 24, 2021, 9 pages.
(Continued)

*Primary Examiner* — Marcus T Riley
(74) *Attorney, Agent, or Firm* — Muncy, Geissler, Olds & Lowe, P.C.

(57) ABSTRACT

A method and an apparatus of recognizing a named entity are provided. The method of recognizing a named entity includes: acquiring to-be-processed electronic text, the to-be-processed electronic text including words, characters and/or symbols; generating, based on each word in the to-be-processed electronic text, a corresponding word vector, and generating, based on each character or symbol in the to-be-processed electronic text, a corresponding character vector; generating a feature vector according to the word vector and/or the character vector by using a BiLSTM model; and inputting the feature vector into a random field model to recognize a named entity and acquire a type of the named entity.

18 Claims, 1 Drawing Sheet

(51) Int. Cl.
*G06K 9/62* (2022.01)
*G06N 3/08* (2006.01)

(56) References Cited

U.S. PATENT DOCUMENTS

| | | | | |
|---|---|---|---|---|
| 2003/0169925 | A1* | 9/2003 | Polonowski | G06K 9/6272 382/198 |
| 2014/0201126 | A1* | 7/2014 | Zadeh | A61B 5/7221 706/52 |
| 2015/0302242 | A1* | 10/2015 | Lee | G06F 40/171 382/189 |
| 2017/0228361 | A1* | 8/2017 | Zhang | G06F 16/313 |
| 2018/0189269 | A1* | 7/2018 | Quirk | G06F 40/295 |
| 2018/0268015 | A1* | 9/2018 | Sugaberry | G06N 3/049 |
| 2020/0251213 | A1* | 8/2020 | Tran | G06N 20/00 |
| 2021/0103701 | A1* | 4/2021 | Zhang | G06F 40/205 |

FOREIGN PATENT DOCUMENTS

| | | |
|---|---|---|
| CN | 107908614 A | 4/2018 |
| CN | 108229582 A | 6/2018 |
| CN | 108536679 A | 9/2018 |
| CN | 108829681 A | 11/2018 |
| CN | 109471895 A | 3/2019 |
| CN | 109522546 A | 3/2019 |
| CN | 109871545 A | 6/2019 |

OTHER PUBLICATIONS

Tran et al., "Named Entity Recognition with stack residual LSTM and trainable bias decoding," Jul. 11, 2017, 10 pages.
International Search Report dated May 6, 2020 in PCT/CN2020/076196 (13 pages).
Chinese Office Action dated May 7, 2020 in Chinese Application No. CN201910325442.6 (17 pages).

* cited by examiner

METHOD AND APPARATUS OF RECOGNIZING NAMED ENTITY

CROSS-REFERENCE TO RELATED APPLICATIONS

The present application is a U.S. national phase application of a PCT Application No. PCT/CN2020/076196 filed on Feb. 21, 2020, which claims a priority to Chinese Patent Application No. 201910325442.6 filed in China on Apr. 22, 2019, the disclosures of which are incorporated in their entirety by reference herein.

TECHNICAL FIELD

The present disclosure relates to the field of information technology, in particular to a method and an apparatus of recognizing a named entity.

BACKGROUND

The named-entity recognition refers to the recognition of an entity with a specific meaning in the text. The entity mainly includes a personal name, a place name, an organization name, a proper noun or the like. In the medical field, the automatic recognition of named entities from an electronic medical record is significant for the construction of a medical knowledge base and the support for clinical decisions. Compared with named-entity recognition in general fields, the named-entity recognition performed on a Chinese electronic medical record suffers from poor precision because there are relatively short sentences and frequent abbreviations in the electronic medical record.

SUMMARY

The technical solutions provided in the present disclosure are as follows.

In an aspect, a method of recognizing a named entity is provided, including:

acquiring to-be-processed electronic text, where the to-be-processed electronic text includes words, characters and/or symbols;

generating, based on each word in the to-be-processed electronic text, a corresponding word vector, and generating, based on each character or symbol in the to-be-processed electronic text, a corresponding character vector;

generating a feature vector according to the word vector and the character vector by using a bi-directional long short-term memory (BiLSTM) model; and inputting the feature vector into a random field model to recognize a named entity and acquire a type of the named entity.

The generating the feature vector according to the word vector and the character vector by using the BiLSTM model further includes:

inputting the word vector into the BiLSTM model to generate a first high-level feature vector;

concatenating the character vector with the first high-level feature vector to acquire a first transitional feature vector;

inputting the first transitional feature vector into the BiLSTM model to generate a second high-level feature vector;

concatenating the first transitional feature vector with the second high-level feature vector to acquire a second transitional feature vector;

inputting the second transitional feature vector into the BiLSTM model to generate a third high-level feature vector; and using the third high-level feature vector as the feature vector.

The method of recognizing a named entity in the present disclosure further includes:

acquiring training data, where the training data includes history electronic text, a history named entity, and a corresponding history named entity type; and optimizing a conditional random field (CRF) model according to the history electronic text, the history named entity, and the corresponding history named entity type.

The method of recognizing a named entity in the present disclosure further includes:

optimizing the CRF model through multiple iterations of a limited-memory Broyden-Fletcher-Goldfarb-Shanno (LBFGS) algorithm.

The to-be-processed electronic text includes a Chinese electronic medical record.

The present disclosure further provides in some embodiments a method of constructing a knowledge graph, including: recognizing a named entity by using the method of recognizing a named entity; and constructing the knowledge graph according to the recognized named entity.

The present disclosure further provides in some embodiments a device of recognizing a named entity, including: a storage, a processor, and a computer program stored in the storage and configured to be executed by the processor, where the processor is configured to execute the computer program to implement the steps in the foregoing method of recognizing a named entity.

The present disclosure further provides in some embodiments a computer-readable storage medium storing therein a computer program, where the computer program is configured to be executed by a processor to implement the steps in the foregoing method of recognizing a named entity.

DETAILED DESCRIPTION

To make the technical problems, the technical solutions, and advantages of the present disclosure clearer, detailed descriptions are provided below with reference to the accompanying drawings and specific embodiments.

For named-entity recognition in a Chinese electronic medical record, the precision of named-entity recognition is not high because there are relatively short sentences and frequent abbreviations in the Chinese electronic medical record. Therefore, the technical solutions in the present disclosure can be used to improve the precision of named-entity recognition performed on a Chinese electronic medical record.

Figure 1:
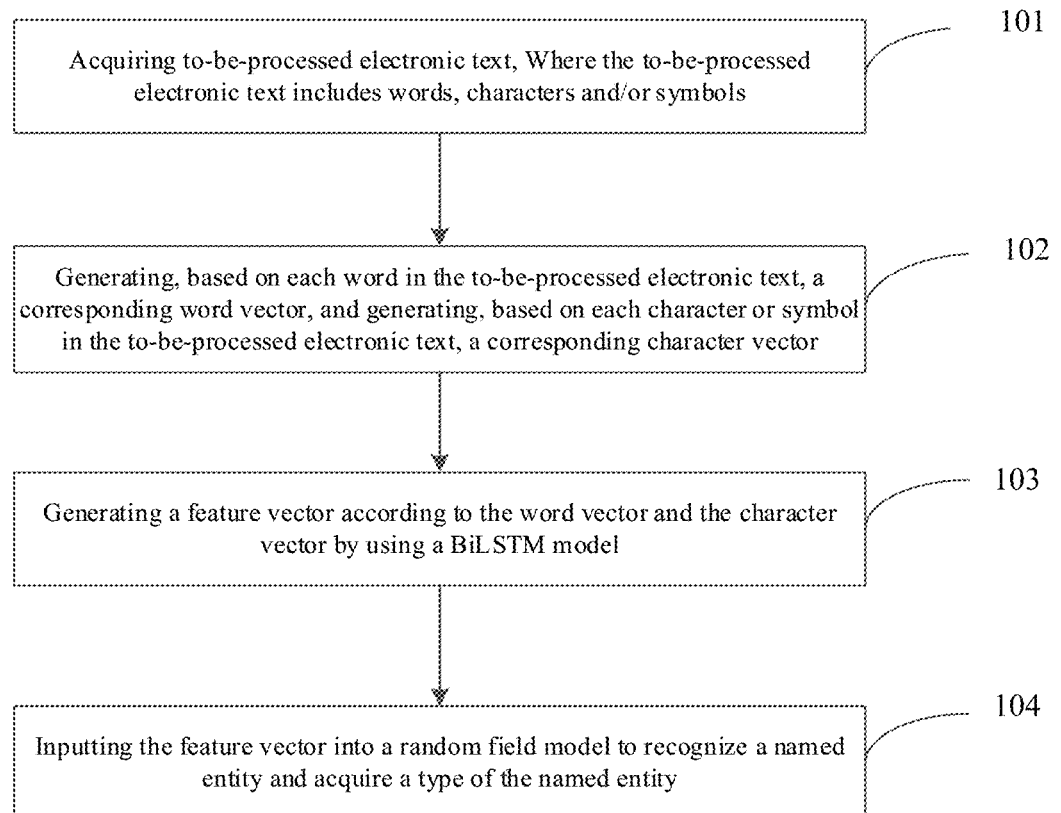
FIG. 1 is a schematic flowchart of a method of recognizing a named entity according to an embodiment of the present disclosure.

The present disclosure provides in some embodiments a method of recognizing a named entity. As shown in FIG. 1, the method includes the following steps.

A step 101 includes: acquiring to-be-processed electronic text, where the to-be-processed electronic text includes words, characters and/or symbols. The to-be-processed electronic text includes a Chinese electronic medical record.

The method of recognizing a named entity in the present disclosure further includes: performing data preprocessing on the to-be-processed electronic text. The data preprocessing includes data cleansing, data integration, data reduction, and data transformation. The data preprocessing can improve data quality, including accuracy, integrity, consistency, etc.

After the data preprocessing is performed on the Chinese electronic medical record, a word segmentation tool is used to perform word segmentation on the Chinese electronic medical record.

Word segmentation is performed on the to-be-processed electronic text by using a word segmentation tool, to acquire the words, the characters and/or the symbols in the to-be-processed electronic text. The word segmentation tool includes a Jieba word segmentation tool.

The Jieba word segmentation tool is an algorithm model for calculating a language probability. The probability, i.e., the reasonability, of each word segmentation result is calculated statistically, to obtain word segmentation results that are consistent with speaking or writing habits. The Jieba word segmentation tool can perform word segmentation on Chinese text adequately, and the correctness of word segmentation is high.

A database used by the word segmentation tool includes an International Classification of Diseases (ICD) database.

According to a development program of the Jieba word segmentation tool, every time the Jieba word segmentation tool is started, a default database or dictionary, that is, a universal database or dictionary, is imported first. During the use of the Jieba word segmentation tool, a user can import an applicable database or dictionary according to an actual application. The database or dictionary is appended to the default database or dictionary and usually does not overwrite the original database or dictionary. During the word segmentation process of the Jieba word segmentation tool, a word is searched for in the database or dictionary. For example, the word "oral ulcer" may not exist in the default database or dictionary. During word segmentation, the Jieba word segmentation tool cuts one sentence into a plurality of segments, to find a segmentation manner with the highest probability of yielding correct segments. In this process, a sub-segment is searched for in the database or dictionary.

The ICD database ICD10 used in the Jieba word segmentation tool is used as an example. That is, the ICD database ICD10 is imported in the Jieba word segmentation tool. For example, "给与右下肢持续皮牵引 (which means "apply continuous skin traction to the right lower extremity")" is recorded in the Chinese electronic medical record. The Jieba word segmentation tool conducts word segmentation by using the database ICD10, and word segmentation results are "给与 (which means "apply")", "右下肢 (which means "right lower extremity")", "持续 (which means "continuous")", "皮 (which means "skin")", and "牵引 (which means "traction")".

The ICD database needs to be trained before usage, to ensure the accuracy and completeness of keywords in the database. Therefore, a training database may be established to complete the training of the ICD database.

The training database includes a large number of Chinese electronic medical records. Professionals may be enlisted to label named entities and entity types of the Chinese electronic medical records in detail. There may be a total of five major classes of entity types, including body parts, diseases and diagnoses, symptoms and signs, checks and tests, and treatment. {B, D, S, C, T} are respectively used as the labels of the five major classes of entities. A nonentity is labeled as {X}.

A step 102 includes: generating, based on each word in the to-be-processed electronic text, a corresponding word vector, and generating, based on each character or symbol in the to-be-processed electronic text, a corresponding character vector.

As an example, specifically, a word2vec algorithm may be applied to a word segmentation result to transform a word into a word vector. For example, the word vector may be a 300-dimensional vector.

Each character or symbol in a training text is transformed into a character vector. Specifically, the word2vec algorithm may be used to transform a character or symbol into a character vector. For example, the character vector may be a 128-dimensional vector. Character-based character vectors are derived from the Chinese electronic medical record, in which each character or symbol is represented by a character vector (for example, a character embedding vector). That is, different dense vectors represent different characters or symbols.

Because a computer can only perform computation on types of a numeric nature, and inputted words, characters and symbols are of a character type, the computer cannot perform computation directly. Therefore, the words and characters need to be transformed into numeric vectors. Word vectors and character vectors are used to train a preset long short-term memory (LSTM) model, and character vector features based on a character granularity and word vector features integrating semantic information may be retrieved.

A step 103 includes: generating a feature vector according to the word vector and the character vector by using a BiLSTM model.

The generating the feature vector according to the word vector and/or the character vector by using the BiLSTM model further includes:

inputting the word vector into the BiLSTM model to generate a first high-level feature vector;

concatenating the character vector with the first high-level feature vector to acquire a first transitional feature vector;

inputting the first transitional feature vector into the BiLSTM model to generate a second high-level feature vector;

concatenating the first transitional feature vector with the second high-level feature vector to acquire a second transitional feature vector;

inputting the second transitional feature vector into the BiLSTM model to generate a third high-level feature vector; and using the third high-level feature vector as the feature vector.

As an example, the BiLSTM model is used to perform learning on word vectors or character vectors resulting from the transformation using the word2vec algorithm, to acquire corresponding word vector features or character vector features.

The word vector is inputted into the BiLSTM model to generate a first high-level feature vector Y0. The character vector is concatenated with the first high-level feature vector Y0 to acquire a first transitional feature vector H1. The first transitional feature vector H1 is inputted into the BiLSTM model to generate a second high-level feature vector Y2. The first transitional feature vector H1 is concatenated with the second high-level feature vector Y2 to acquire a second transitional feature vector H2. The second transitional feature vector H2 is inputted into the BiLSTM model for training, to generate a third high-level feature vector Y3. The process of combining the feature H1 and the feature Y2 as an input to the BiLSTM model is residual learning. In the foregoing feature processing step, the process of using BiLSTM three times in total can be referred to as stacked BiLSTM.

Certainly, in the technical solution in the present disclosure, the number of times that the LSTM model is used is not limited to 3, but may be another number. 3 is only used as an example for description.

A step 104 includes: inputting the feature vector into a random field model to recognize a named entity and acquire a type of the named entity.

By means of a CRF model, an entity type of each word or symbol may be predicted. An input to the CRF model is a high-level feature, and an output from the CRF model is an inputted text and a type corresponding to the text, that is, a nonentity type (represented by X) or an entity type (represented by B, D, S, C or T).

The method of recognizing a named entity of the present disclosure further includes: acquiring training data, where the training data includes: history electronic text, a history named entity, and a corresponding history named entity type; and optimizing a CRF model according to the history electronic text, the history named entity, and the corresponding history named entity type.

The method of recognizing a named entity of the present disclosure further includes: optimizing the CRF model through multiple iterations of an LBFGS algorithm.

The LBFGS algorithm refers to performing a Broyden-Fletcher-Goldfarb-Shanno (BFGS) algorithm in limited memory. The LBFGS algorithm is an optimization algorithm of a neural network, is suitable for processing a large volume of data, has a high convergence rate, and can save a lot of memory space and computing resources.

During the use of the CRF model, a weight coefficient is initialized firstly. With an initial weight coefficient, there is an error between an outputted predicted value and a ground truth. If the error is greater than an error threshold, the CRF model needs to be optimized. Specifically, the initial weight coefficient is optimized.

In the embodiments of the present disclosure, the optimization algorithm is an LBFGS algorithm. Based on error of the output of the CRF model, calculation and back propagation are performed using the LBFGS algorithm, to obtain a series of parameters. A person skilled in the art can adjust the initial weight coefficient of the CRF model according to the series of parameters to obtain an optimized weight coefficient. If the error of the output of the CRF model obtained according to the optimized weight coefficient is still greater than the error threshold, the CRF model needs to be optimized multiple times, that is, multiple iterations of the LBFGS algorithm is required, to reduce the error of the CRF model to below the error threshold.

The method of recognizing a named entity of the present disclosure further includes: evaluating a combination of the BiLSTM model and a CRF model by using an evaluation parameter, the evaluation parameter including: precision, recall rate, F1 score.

After the LSTM model and the CRF model are used to perform named-entity recognition, the precision, the recall rate, and the F1 score may be used to measure the performance of named-entity recognition combining the LSTM model and the CRF model. Table 1 shows model precision and recall rate data obtained according to model output data and actual data of history users. A person skilled in the art may evaluate the model according to the data in Table 1, and may further optimize the model according to the data.

TABLE 1

|   | Precision | Recall rate | F1 score |
| --- | --- | --- | --- |
| D | 0.600 | 0.061 | 0.111 |
| S | 0.752 | 0.820 | 0.784 |
| C | 0.881 | 0.904 | 0.892 |
| B | 0.523 | 0.832 | 0.642 |
| T | 0.891 | 0.948 | 0.919 |

In the embodiments of the present disclosure, a feature vector is retrieved according to both a word vector and a character vector, so that features of both characters and/or symbols and words can be acquired, meanwhile errors in word segmentation are greatly reduced. In addition, the LSTM model and the CRF model are combined to perform named-entity recognition, so that features of more characters and/or symbols and words can be absorbed, thereby further improving the precision of entity recognition.

Figure 2:
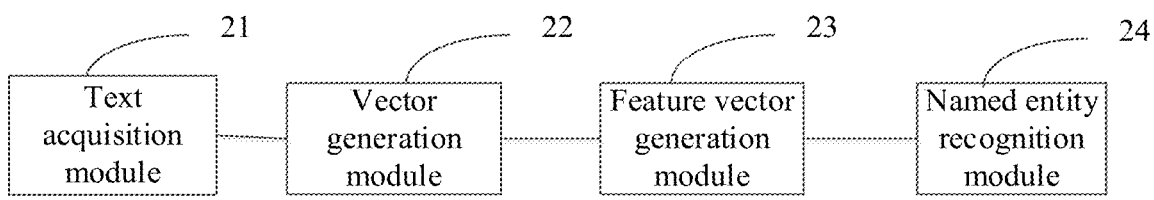
FIG. 2 is a structural block diagram of an apparatus of recognizing a named entity according to an embodiment of the present disclosure.

The present disclosure further provides in some embodiments an apparatus of recognizing a named entity. As shown in FIG. 2, the apparatus includes:

a text acquisition module 21, configured to acquire to-be-processed electronic text, where the to-be-processed electronic text includes words, characters and/or symbols;

a vector generation module 22, configured to: generate, based on each word in the to-be-processed electronic text, a corresponding word vector, and generate, based on each character or symbol in the to-be-processed electronic text, a corresponding character vector;

a feature vector generation module 23, configured to generate a feature vector according to the word vector and the character vector by using a BiLSTM model; and a named entity recognition module 24, configured to: input the feature vector into a random field model to recognize a named entity and acquire a type of the named entity.

In the embodiment, a feature vector is retrieved according to both a word vector and a character vector, so that features of both characters and/or symbols and words can be acquired, and errors in word segmentation are further greatly reduced. In addition, the LSTM model and a CRF model are combined to perform named-entity recognition, so that features of more characters and/or symbols and words can be absorbed, thereby further improving the precision of entity recognition.

The feature vector generation module 23 further includes:

a generation unit of a first high-level feature vector, configured to input the word vector into the BiLSTM model to generate the first high-level feature vector;

an acquisition unit of a first transitional feature vector, configured to concatenate the character vector with the first high-level feature vector to acquire the first transitional feature vector;

a generation unit of a second high-level feature vector, configured to input the first transitional feature vector into the BiLSTM model to generate the second high-level feature vector;

an acquisition unit of a second transitional feature vector, configured to concatenate the first transitional feature vector with the second high-level feature vector to acquire the second transitional feature vector;

a generation unit of a third high-level feature vector, configured to input the second transitional feature vector into the BiLSTM model to generate the third high-level feature vector; and a feature vector unit, configured to use the third high-level feature vector as the feature vector.

The apparatus of recognizing a named entity in the present disclosure further includes:

a training data acquisition module, configured to acquire training data, where the training data includes history electronic text, a history named entity, and a corresponding history named entity type; and a model optimization module, configured to optimize a CRF model according to the history electronic text, the history named entity, and the corresponding history named entity type.

The apparatus of recognizing a named entity of the present disclosure further includes: an algorithm iteration unit, configured to optimize the CRF model through multiple iterations of an LBFGS algorithm.

The apparatus of recognizing a named entity of the present disclosure further includes: a word segmentation module, configured to perform word segmentation on the to-be-processed electronic text by using a word segmentation tool, to acquire the words, the characters and/or the symbols in the to-be-processed electronic text.

The apparatus of recognizing a named entity in the present disclosure further includes: a preprocessing module, configured to perform data preprocessing on the to-be-processed electronic text.

The apparatus of recognizing a named entity in the present disclosure further includes: a model evaluation module, configured to evaluate a combination of the BiLSTM model and a CRF model by using an evaluation parameter, where the evaluation parameter includes: precision, recall rate, F1 score.

The LSTM model is used three times in the embodiment, that is, a stacked LSTM model is used. The use of the stacked LSTM model can resolve the problem that key information of features is lost in the process of network training and transfer, thereby facilitating the retrieval of key features. Certainly, in the technical solution of the present disclosure, the number of times that the LSTM model is used is not limited to 3, but may be another number. 3 is only used as an example for description.

The trained LSTM model and the optimized CRF model are used to perform named-entity recognition on the to-be-processed electronic text, and the to-be-processed electronic text is inputted into the trained LSTM model and the CRF model, so that named entities in the to-be-processed electronic text can be outputted.

The technical solution in the embodiment provides a method of recognizing a named entity in a Chinese electronic medical record by using a stacked residual BiLSTM combining character features and word features, so that more abundant feature information is inputted, and feature information loss in a training process is reduced, thereby improving the accuracy of named-entity recognition in the Chinese electronic medical record.

The embodiments of the present disclosure have the following beneficial effects.

In the foregoing solution, a feature vector is retrieved according to both a word vector and a character vector, so that features of both characters and/or symbols and words can be acquired, meanwhile errors in word segmentation are greatly reduced. In addition, the LSTM model and the CRF model are combined to perform named-entity recognition, so that features of more characters and/or symbols and words can be absorbed, thereby further improving the precision of entity recognition.

The present disclosure further provides in some embodiments a method of constructing a knowledge graph, including: recognizing a named entity by using the method of recognizing a named entity; and constructing a knowledge graph according to the recognized named entity.

By constructing the knowledge graph, all named entities associated with the recognized named entity can be acquired according to the recognized named entity, and include, but are not limited to: a first-order associated named entity and a second-order associated named entity.

The present disclosure further provides in some embodiments a device of recognizing a named entity, including: a storage, a processor, and a computer program stored in the storage and configured to be executed by the processor, where the processor is configured to execute the computer program to implement the steps in the foregoing method of recognizing a named entity.

The present disclosure further provides in some embodiments a computer-readable storage medium storing therein a computer program, where the computer program is configured to be executed by a processor to implement the steps in the foregoing method of recognizing a named entity.

It may be understood that the embodiments described herein may be implemented by hardware, software, firmware, middleware, microcode or a combination thereof. For hardware implementation, a processing unit may be implemented in one or more application-specific integrated circuits (ASICs), a digital signal processing (DSP), a DSP device (DSPD), a programmable logic device (PLD), a field-programmable gate array (FPGA), a general-purpose processor, a controller, a microcontroller, a microprocessor, another electronic unit configured to perform the functions in the present application or a combination thereof.

For software implementation, the technologies herein may be implemented by using modules (for example, processes or functions) that perform the functions herein. Software code may be stored in a storage and executed by a processor. The storage may be implemented in the processor or outside the processor.

All embodiments in this specification are described in a progressive manner. Each embodiment focuses on the difference from other embodiments. For the same or similar parts among embodiments, reference may be made to the relevant parts.

A person skilled in the art should understand that the embodiments of the present disclosure may be provided as a method, an apparatus or a computer program product. Therefore, the embodiments of the present disclosure may use a form of hardware only embodiments, software only embodiments, or embodiments with a combination of software and hardware. Moreover, the embodiments of the present disclosure may adopt a form of a computer program product that is implemented on one or more computer-usable storage media (including but not limited to a disk storage, a compact disc read only memory (CD-ROM), an optical storage, and the like) that include computer usable program codes.

The embodiments of the present disclosure are described with reference to the flowcharts and/or block diagrams of the method, the user equipment (system), and the computer program product according to the embodiments of the present disclosure. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a dedicated computer, an embedded processor or a processor of other programmable data processing UE to generate a machine, so that the instructions executed by a computer or a processor of other programmable data processing UE generate an apparatus for implementing functions specified in one or more processes in the flowcharts and/or in one or more blocks in the block diagrams.

These computer program instructions may be stored in a computer readable storage that can instruct the computer or any other programmable data processing UE to work in a specific manner, so that the instructions stored in the computer readable storage generate an article of manufacture that includes an instruction apparatus. The instruction apparatus implements specific functions in one or more processes in the flowcharts and/or in one or more blocks in the block diagrams.

These computer program instructions may be loaded to a computer or other programmable data processing UE, so that a series of operations and steps are performed on the computer or the other programmable UE, thereby generating computer-implemented processing. Therefore, the instructions executed on the computer or the other programmable UE provide steps for implementing specific functions in one or more processes in the flowcharts and/or in one or more blocks in the block diagrams.

Although optional embodiments of the present disclosure are described, other changes and modifications may be made to these embodiments by a person skilled in the art knowing the basic innovative concepts. Therefore, the appended claims intend to be construed as including optional embodiments and all changes and modifications that fall within scope of the embodiments of the present disclosure.

It should further be noted that the relational terms herein such as first and second are used only to differentiate an entity or operation from another entity or operation, and do not require or imply any actual relationship or sequence between these entities or operations. Moreover, the terms "includes", "including", or any variation thereof are intended to cover a non-exclusive inclusion. Therefore, in the context of a process, method, object or UE that includes a series of elements, the process, method, object or UE not only includes such elements, but also includes other elements not specified expressly, or may include elements inherent to the process, method, object or UE. If no more limitations are made, an element limited by "include a/an . . . " does not preclude the existence of other same elements in the process, the method, the object or the UE which includes the element.

The foregoing descriptions are optional implementations of the present disclosure. It should be noted that for a person of ordinary skill in the art, several improvements and modifications may further be made without departing from the principle of the present disclosure. These improvements and modifications should also fall within the scope of the present disclosure.

What is claimed is:

1. A method of recognizing a named entity, comprising:
   acquiring to-be-processed electronic text, wherein the to-be-processed electronic text comprises words, characters and/or symbols;
   generating, based on each word in the to-be-processed electronic text, a corresponding word vector, and generating, based on each character or symbol in the to-be-processed electronic text, a corresponding character vector;
   generating a feature vector according to the corresponding word vector and the corresponding character vector by using a bi-directional long short-term memory (BiLSTM) model; and
   inputting the feature vector into a random field model to recognize the named entity and acquire a type of the named entity,
   wherein said generating the feature vector according to the corresponding word vector and the corresponding character vector by using the BiLSTM model comprises:
      inputting the corresponding word vector into the BiLSTM model to generate a first high-level feature vector;
      concatenating the corresponding character vector with the first high-level feature vector to acquire a first transitional feature vector;
      inputting the first transitional feature vector into the BiLSTM model to generate a second high-level feature vector;
      concatenating the first transitional feature vector with the second high-level feature vector to acquire a second transitional feature vector;
      inputting the second transitional feature vector into the BiLSTM model to generate a third high-level feature vector; and
      using the third high-level feature vector as the feature vector.

2. The method according to claim 1, further comprising:
   acquiring training data, wherein the training data comprises history electronic text, a history named entity, and a corresponding history named entity type; and
   optimizing a conditional random field (CRF) model according to the history electronic text, the history named entity, and the corresponding history named entity type.

3. The method according to claim 2, further comprising:
   optimizing the CRF model through multiple iterations of a limited-memory Broyden— Fletcher—Goldfarb— Shanno (LBFGS) algorithm.

4. The method according to claim 1, wherein the to-be-processed electronic text comprises a Chinese electronic medical record.

5. The method according to claim 1, further comprising:
   performing word segmentation on the to-be-processed electronic text by using a word segmentation tool, to acquire the words, the characters and/or the symbols in the to-be-processed electronic text.

6. The method according to claim 5, wherein the word segmentation tool comprises a Jieba word segmentation tool.

7. The method according to claim 1, further comprising:
   performing data preprocessing on the to-be-processed electronic text.

8. The method according to claim 1, further comprising:
   evaluating a combination of the BiLSTM model and a conditional random field (CRF) model by using an evaluation parameter, wherein the evaluation parameter comprises: precision, recall rate, F1 score.

9. The method according to claim 7, wherein a database used by a word segmentation tool is an International Classification of Diseases (ICD) database.

10. A method of constructing a knowledge graph, comprising:
recognizing a named entity by using the method of recognizing a named entity according to claim 1; and
constructing the knowledge graph according to the recognized named entity.

11. A device of recognizing a named entity, comprising: a non-transitory computer-readable memory, a processor, and a computer program stored in the non-transitory computer-readable memory and capable of being executed by the processor, wherein when the computer program is executed by the processor, the steps in the method of recognizing a named entity according to claim 1 are implemented.

12. The device according to claim 11, wherein when the computer program is executed by the processor, following steps are further implemented comprising:
acquiring training data, wherein the training data comprises history electronic text, a history named entity, and a corresponding history named entity type; and
optimizing a conditional random field (CRF) model according to the history electronic text, the history named entity, and the corresponding history named entity type.

13. The device according to claim 12, wherein when the computer program is executed by the processor, a following step is further implemented comprising optimizing the CRF model through multiple iterations of a limited-memory Broyden—Fletcher— Goldfarb—Shanno (LBFGS) algorithm.

14. The device according to claim 11, wherein the to-be-processed electronic text comprises a Chinese electronic medical record.

15. The device according to claim 11, wherein when the computer program is executed by the processor, a following step is further implemented comprising performing word segmentation on the to-be-processed electronic text by using a word segmentation tool, to acquire the words, the characters and/or the symbols in the to-be-processed electronic text.

16. The device according to claim 15, wherein the word segmentation tool comprises a Jieba word segmentation tool.

17. The device according to claim 11, wherein when the computer program is executed by the processor, a following step is further implemented comprising performing data preprocessing on the to-be-processed electronic text.

18. A non-transitory computer-readable storage medium storing therein a computer program, wherein when the computer program is executed by the processor, the steps in the method of recognizing a named entity according to claim 1 are implemented.

* * * * *